E. L. ANDERSON.
KETTLE.
APPLICATION FILED JUNE 7, 1918. RENEWED JUNE 2, 1919.
1,326,628. Patented Dec. 30, 1919.
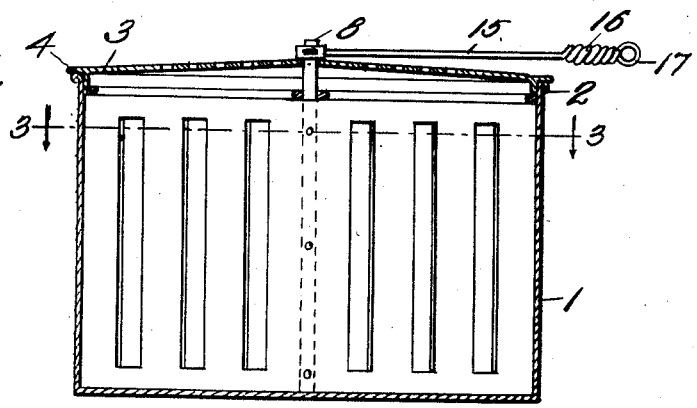
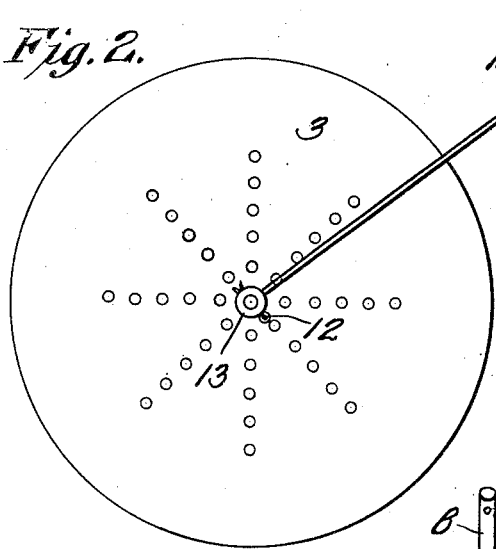
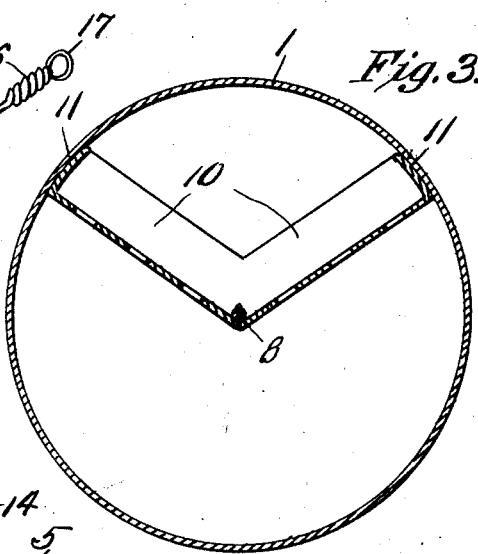
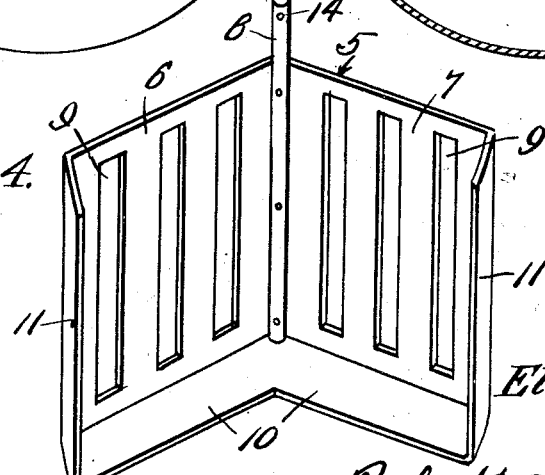
WITNESSES
INVENTOR
Ella L. Anderson,
BY
ATTORNEY

UNITED STATES PATENT OFFICE.

ELLA L. ANDERSON, OF INDIANAPOLIS, INDIANA.

KETTLE.

1,326,628.   Specification of Letters Patent.   Patented Dec. 30, 1919.

Application filed June 7, 1918, Serial No. 238,727. Renewed June 2, 1919. Serial No. 301,329.

*To all whom it may concern:*

Be it known that I, ELLA L. ANDERSON, a citizen of the United States, residing at Indianapolis, in the county of Marion and State of Indiana, have invented certain new and useful Improvements in Kettles, of which the following is a specification.

This invention relates to kitchen utensils, and more particularly to preserving kettles.

The object of the invention is to provide a kettle constructed for cooking preserves, fruit butter, or any material which requires stirring, in which improved agitating means are provided to effectively scrape the material from the sides and bottom of the kettle while stirring or agitating it.

Another object is to provide a kettle of this class with a combined cover and agitator support.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a vertical central section of a kettle constructed in accordance with this invention, Fig. 2 is a plan view thereof, Fig. 3 is a horizontal section taken on the line 3—3 of Fig. 1, and Fig. 4 is a detail perspective view of the agitator detached.

In the embodiment illustrated, a kettle 1 is shown composed of any suitable metal having a roller rim 2 at its upper edge with a perforated cover 3 flanged as shown at 4 to fit within the kettle.

The agitator 5 which constitutes the gist of this invention is shown in detail in Fig. 4 and comprises a pair of angularly disposed blades 6 and 7 formed by bending a piece of sheet metal transversely, said blades being mounted on an upright shaft 8, said shaft being secured at the corner or juncture of the blades and extending the full height thereof and reinforcing them at this point. This shaft extends at one end above the upper edges of these blades and is adapted to pass through a central opening in the cover 3 to provide for the attachment thereto of an operating handle 15 which will be hereinafter more fully described. The blades 6 and 7 as shown are constructed of a single piece of sheet metal with longitudinally disposed slots or openings 9 formed therein and spaced laterally from each other to provide for the passage therethrough of the material being stirred so as to obtain a maximum mixing of the contents of the kettle. Laterally extending flanges 10 are carried by the lower edges of the blades 6 and 7 and are designed to contact with the bottom of the kettle 1 when in operative position so as to exert a scraping action on the bottom when the agitator is rotated to prevent the material treated from sticking to the bottom. These blades 6 and 7 are also provided on their other ends with upstanding scraping blades 11 which are positioned at an oblique angle and are designed to engage at their free edges with the side walls of the kettle 1 as shown in Fig. 3, so that no material will be permitted to adhere to these walls during the cooking operation.

The handle 15 is detachably connected with the projecting end of the shaft 8, being here shown secured thereto by means of a cotter pin 12 passing transversely through a collar 13 on the end of said handle and through the aperture 14 in the shaft. This handle 15 extends radially beyond the collar 13 and is preferably composed of heavy wire twisted at one end to form a hand grip 16 which terminates in a loop 17 to facilitate hanging up of said handle when not in use.

In the use of this apparatus, the dasher or agitator 5 having been placed in position in the kettle 1, the preserves, fruit butter or other material to be cooked is inserted therein and the top 3 placed in position with the shaft 8 projecting through its center. The handle 15 is then engaged with this projecting shaft end and secured by the cotter pin 12 and the apparatus is ready for use. The perforations in the cover 3 permit the steam to pass freely out and the extension of the handle 16 beyond the side walls of the kettle provides for the rotation of the agitator 5 by moving said handle horizontally without danger of the operator becoming scalded by the steam passing through the top. When this handle 15 is moved horizontally in one direction it will be obvious that the free edge of one of the scraping blades 11 will engage the side walls of the vessel 1 and the free edge of the flange 10 carried by the same blade will operate to scrape the bottom of the kettle and when rotated in the opposite direction the flanges 10 and 11 on the other blade will be brought into operation, thereby preventing all possibility of the material being cooked adhering either to the bottom or side walls of the kettle. This rotation of the agitator also causes the material being cooked to be forced through the openings 9 in the agitator and thereby stir the contents of the kettle and thoroughly commingle it.

When the kettle is not in use the parts may be readily removed and hung up or otherwise put away and being all separable are easily cleaned.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

An agitator for kettles and the like comprising a pair of blades formed from a single piece of sheet metal bent transversely to position the blades at an angle to each other, said blades having transverse slots spaced laterally to provide for the passage of the material and each blade having integral laterally extending flanges on its lower edge and on its side edge, said side flanges being positioned at an oblique angle to the blade, and an upright shaft secured at the juncture of said blades and extending the full height thereof with one end projecting above the edge of the blades forming a reinforce and handle attachment element.

In testimony whereof I affix my signature in presence of two witnesses.

ELLA L. ANDERSON.

Witnesses:
LOSSIR BRANNAN,
JOSEPH S. WOODWARD.